United States Patent
Miwa et al.

(10) Patent No.: US 10,646,950 B2
(45) Date of Patent: May 12, 2020

(54) SPOT WELDING METHOD AND DEVICE

(71) Applicant: HONDA MOTOR CO., LTD., Minato-ku, Tokyo (JP)

(72) Inventors: Hiroshi Miwa, Tochigi-ken (JP); Yohei Teragaito, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 293 days.

(21) Appl. No.: 15/739,207

(22) PCT Filed: Jun. 22, 2016

(86) PCT No.: PCT/JP2016/068465
§ 371 (c)(1),
(2) Date: Dec. 22, 2017

(87) PCT Pub. No.: WO2016/208610
PCT Pub. Date: Dec. 29, 2016

(65) Prior Publication Data
US 2018/0185952 A1    Jul. 5, 2018

(30) Foreign Application Priority Data
Jun. 26, 2015  (JP) ................................. 2015-128232

(51) Int. Cl.
*B23K 11/11* (2006.01)
*B23K 11/16* (2006.01)
(Continued)

(52) U.S. Cl.
CPC ............. *B23K 11/11* (2013.01); *B23K 11/115* (2013.01); *B23K 11/16* (2013.01); *B23K 11/24* (2013.01);
(Continued)

(58) Field of Classification Search
CPC ....... B23K 11/11; B23K 11/115; B23K 11/16; B23K 11/24; B23K 11/255; B23K 11/253; B23K 11/315
See application file for complete search history.

(56) References Cited

U.S. PATENT DOCUMENTS 5,977,505 A * 11/1999 Kobayashi ............. B23K 11/16
                                                        219/91.2
9,108,265 B2 * 8/2015 Sakai .................... B23K 11/115
(Continued)

FOREIGN PATENT DOCUMENTS

CN      102950371      3/2013
DE      102013112436   5/2015
(Continued)

OTHER PUBLICATIONS

International Search Report and Written Opinion for International Patent Application No. PCT/JP2016/068465 dated Sep. 6, 2016, 8 pages.
(Continued)

*Primary Examiner* — Nicholas J. Weiss
(74) *Attorney, Agent, or Firm* — Amin, Turocy & Watson, LLP

(57) ABSTRACT

In the present invention, while a welding current is applied with respect to a laminate body comprising thick metal plates and thin metal plates, a first welding pressure (F1) with respect to the laminate body from an upper tip contacting the metal plate and a second welding pressure (F2) with respect to the laminate body from a lower tip contacting the metal plate are changed relative to each other. Specifically, F1<F2 in a first step which is an initial period of welding, F1=F2 in a second step which is an intermediate period of welding, and F1>F2 in a third step which is a final period of welding.

7 Claims, 5 Drawing Sheets

(51) Int. Cl.
  *B23K 11/25* (2006.01)
  *B23K 11/24* (2006.01)
  *B23K 103/04* (2006.01)
  *B23K 103/16* (2006.01)
(52) U.S. Cl.
  CPC ........ *B23K 11/255* (2013.01); *B23K 2103/04* (2018.08); *B23K 2103/166* (2018.08)

(56) References Cited

U.S. PATENT DOCUMENTS

| | | | |
|---|---|---|---|
| 9,186,747 B2* | 11/2015 | Ogake | B23K 11/0033 |
| 10,207,354 B2* | 2/2019 | Matsushita | B23K 11/115 |
| 2013/0037528 A1 | 2/2013 | Ogake | |
| 2016/0288241 A1 | 10/2016 | Chergui | |
| 2018/0043459 A1* | 2/2018 | Sawanishi | B23K 11/24 |
| 2018/0043461 A1* | 2/2018 | Taniguchi | B23K 11/25 |
| 2019/0240768 A1* | 8/2019 | Furusako | B23K 11/115 |

FOREIGN PATENT DOCUMENTS

| | | |
|---|---|---|
| JP | 2003-251469 | 9/2003 |
| JP | 2012-076125 | 4/2012 |
| JP | 2014-184461 | 10/2014 |

OTHER PUBLICATIONS

Chinese Office Action and Search Report for Chinese Patent Application No. 201680037408.3 dated Apr. 30, 2019.
Indian Office Action for Indian Patent Application No. 201847002603 dated Jan. 3, 2020.

* cited by examiner

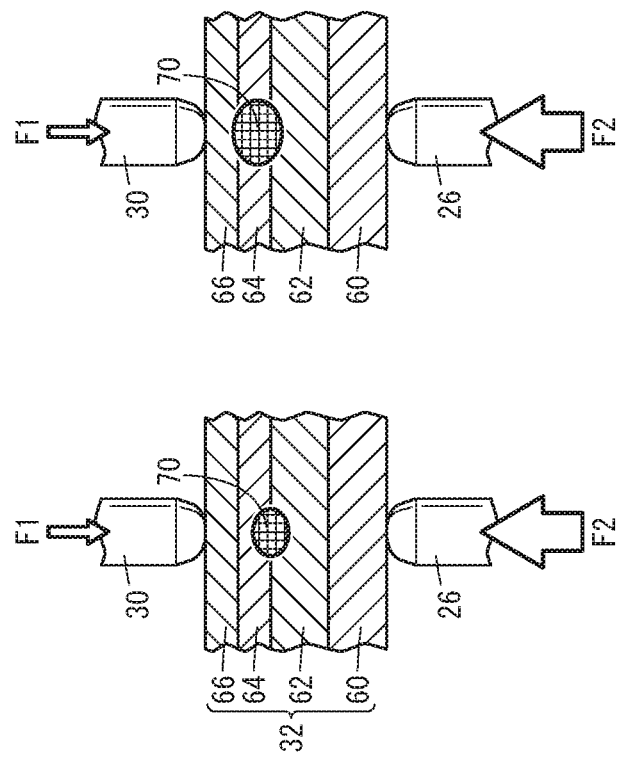
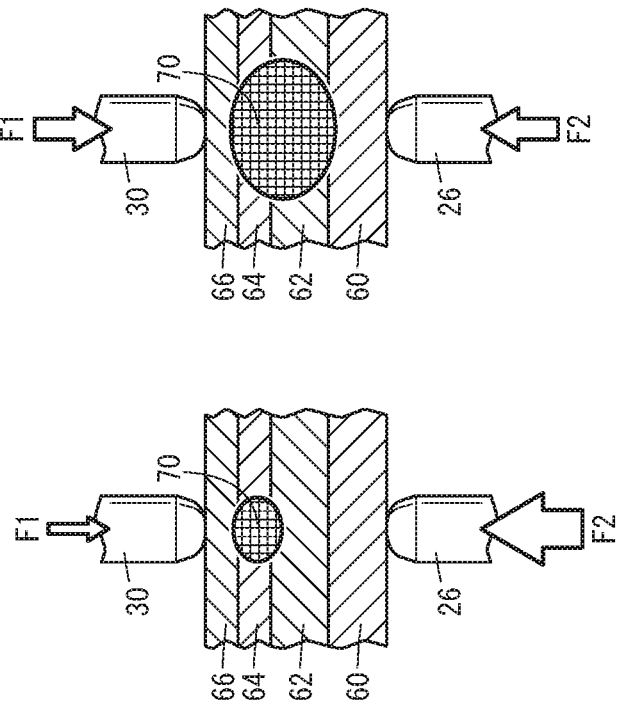
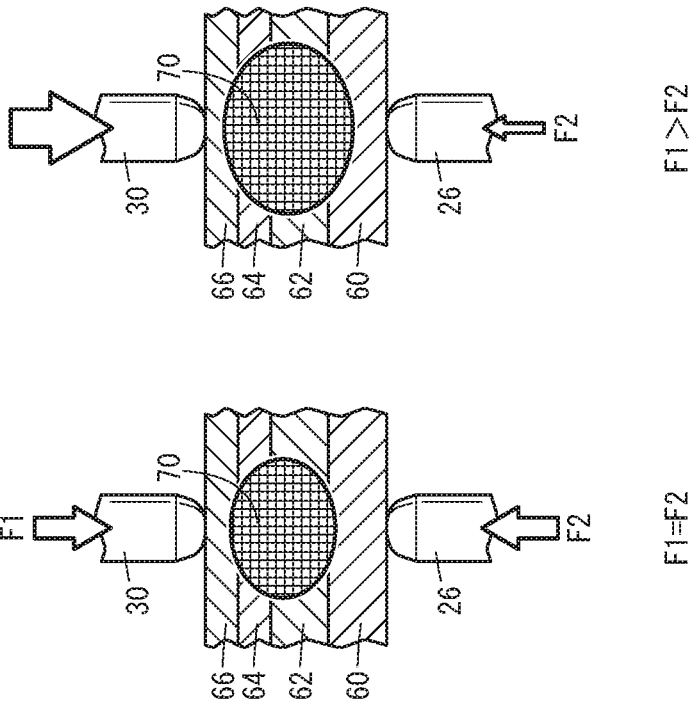
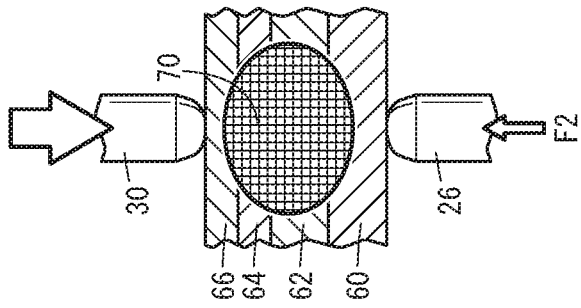

PRIOR ART ion time of the welding current, the position where the nugget is grown is controlled. Accordingly, the nugget can be sufficiently grown in the vicinity of the contact surfaces of the workpieces forming the laminated body.

SPOT WELDING METHOD AND DEVICE

TECHNICAL FIELD

The present invention relates to a spot welding method and device for spot welding a laminated body formed by laminating at least three workpieces.

BACKGROUND ART

The so-called Mohican roof as the automobile body roof part is formed, for example, by integrating the laminated body 1 shown in FIG. 5A by welding. That is, the laminated body 1 is made up of two thick-walled workpieces 2, 3 made of high tensile strength steel and having substantially the same thickness, and two thin-walled workpieces 4, 5 made of mild steel and having substantially the same thickness stacked together. The two thick-walled workpieces 2, 3 are inner members facing the cabin side, while the two thin-walled workpieces 4, 5 are outer members facing outside the vehicle. In particular, the uppermost thin-walled workpieces 4, 5 are visually recognized by the user.

Welding of the laminated body 1 is performed by spot welding in which the nugget 6 is formed at a plurality of locations. That is, two thick-walled workpieces 2, 3 and two thin-walled workpieces 4, 5 are stacked in this order from the bottom, and the laminated body 1 is formed. Then, the laminated body 1 is sandwiched between the upper tip 7 and the lower tip 8. At this time, the upper tip 7 contacts the uppermost thin-walled workpiece 5 and the lower tip 8 contacts the lowermost thick-walled workpiece 2. The pressing force F1 by the upper tip 7 and the pressing force F2 by the lower tip 8 are set to be equal.

In this state, for example, a welding current flows from the upper tip 7 to the lower tip 8. Since the thick-walled workpieces 2, 3 have larger electric resistance than the thin-walled workpieces 4, 5, heat generated by energization of the thick-walled workpieces 2, 3 is larger than that of the thin-walled workpieces 4, 5. Accordingly, as shown in FIGS. 5A to 5C, the nugget 6 is preferentially grown between the thick-walled workpieces 2, 3 in the laminated body 1. Therefore, as shown in FIG. 5D, there is a concern that the nugget 6 does not grow to the contact surfaces of the thin-walled workpieces 4, 5, and the thin-walled workpieces 4, 5 are not integrated.

SUMMARY OF INVENTION

The applicant of the present invention has proposed a spot welding method and device capable of avoiding this concern and preventing occurrence of sputtering between adjacent workpieces in Japanese Laid-Open Patent Publication No. 2014-184461.

In the technique described in Japanese Laid-Open Patent Publication No. 2014-184461, an auxiliary electrode having a polarity opposite to that of the upper tip is arranged in the vicinity of the upper tip. That is, the auxiliary electrode is brought into contact with the thin-walled workpiece simultaneously with the upper tip with respect to the laminated body.

Depending on the size and shape of the laminated body, it may be difficult to secure a space for contacting the auxiliary electrode. Also, by providing the auxiliary electrode, the spot welding device becomes relatively large.

A main object of the present invention is to provide a spot welding method which does not require the use of an auxiliary electrode.

Another object of the present invention is to provide a spot welding method capable of sufficiently growing a nugget in the vicinity of contact surfaces of workpieces in a laminated body.

Still another object of the present invention is to provide a spot welding device for carrying out the above-mentioned spot welding method.

According to an embodiment of the present invention, a spot welding method for spot welding is provided by welding current flowing between a first welding tip and a second welding tip, wherein a laminated body is formed of at least three workpieces stacked and including two outermost workpieces, the two outermost workpieces being a thin-walled workpiece and a thick-walled workpiece which are different in thickness from each other, and the laminated body is sandwiched between a first welding tip and a second welding tip, the spot welding method comprising, while the welding current flows through the laminated body positioned and fixed, the steps of: a first step of making a first pressing force to be applied to the laminated body from the first welding tip brought into contact with the thin-walled workpiece smaller than a second pressing force to be applied to the laminated body from the second welding tip brought into contact with the thick-walled workpiece, while forming a nugget between two of the workpieces forming the laminated body for integration of the two workpieces; a second step of making the first pressing force and the second pressing force equal, while growing the nugget toward the thick-walled workpiece; and a third step of making the first pressing force greater than the second pressing force, while growing the nugget until the thick-walled workpiece becomes integral with an adjacent one of the workpieces.

According to another embodiment of the present invention, a spot welding device for spot welding is provided by a positioning and fixing unit configured to position and fix a laminated body formed of at least three workpieces stacked wherein two outermost workpieces are a thin-walled workpiece and a thick-walled workpiece that are different in thickness from each other; a welding gun including a first welding tip and a second welding tip to grip and hole the laminated body for passing a welding current; a pressing force detection unit configured to detect a first pressing force applied to the laminated body by the first welding tip in contact with the thin-walled workpiece and a second pressing force applied to the laminated body by the second welding tip in contact with the thick-walled workpiece; and a control unit configured to control the first pressing force and the second pressing force based on a detection value detected by the pressing force detecting unit, wherein the control unit makes the first pressing force smaller than the second pressing force while a nugget is grown between two of the workpieces constituting the laminated body to integrate the two workpieces, makes the first pressing force and the second pressing force equal while the nugget is grown toward the thick-walled workpiece, and makes the first pressing force greater than the second pressing force (F2) while the nugget is grown until the thick-walled workpiece becomes integral with adjacent one of the workpieces.

As described above, in the present invention, in each of the initial welding stage (first step), the middle welding stage (second step) and the late welding stage of (third step), magnitudes of the first pressing force and the second pressing force are varied relative to each other. Therefore, the contact resistance between the workpieces forming the laminated body varies.

Growth of the nugget is promoted at points where the contact resistance is large. Therefore, by changing the contact resistance as described above, it is possible to make the direction in which the nugget grows preferentially in each of the initial welding stage, the middle welding stage, and the late welding stage. Therefore, in the first step, when the first pressing force and the second pressing force are not changed at all, a nugget is first grown at a point where the nugget hardly grows, then in the second step and the third step, when the first pressing force and the second pressing force are not changed at all, a nugget can be formed by integrating all the workpieces by growing the nugget at a point where the nugget tends to grow.

Therefore, according to the present invention, it is possible to obtain a joined product in which all workpieces are joined and integrated without using an auxiliary electrode. Therefore, even if the space for spot welding is narrow, it is easy to obtain a joined product excellent in joint strength.

In addition, since there is no need to provide an auxiliary electrode, the configuration of the spot welding device is simplified. It is also easy to reduce the size at this rate.

In order to change the first pressing force and the second pressing force relatively, for example, the welding gun having the first welding tip and the second welding tip may be displaced with respect to the laminated body. When the welding gun is supported by a robot, it is also possible to displace the welding gun with respect to the laminated body by an operation of the robot.

Alternatively, the second welding tip may be displaced in a direction toward or away from the thick-walled workpiece. Also in this case, the first pressing force and the second pressing force can be relatively changed.

As described above, according to the present invention, in each of the initial welding stage, the middle welding stage and the late welding stage, the first pressing force of the first welding tip on the laminated body and the second pressing force of the second welding tip on the laminated body are relatively changed in their magnitudes. For this reason, the contact resistance between the workpieces forming the laminated body varies, so that the direction in which the nugget preferentially grows can be made different at each of the initial welding stage, the middle welding stage, and the late welding stage.

Therefore, when the first pressing force and the second pressing force are not changed at all, a nugget is first formed at a point where the nugget hardly grows, then when the first pressing force and the second pressing force are not changed at all, it is possible to control that the nugget grows toward a point where the nugget is easily grow. As a result, the nugget integrates all the workpieces without using an auxiliary electrode, and a joined product showing an excellent joint strength can be obtained.

In addition, since it is unnecessary to provide the auxiliary electrode, the structure of the spot welding device can be simplified and downsized.

The above objects, features and advantages will be readily understood from the following description of embodiments with reference to the accompanying drawings.

BRIEF DESCRIPTION OF DRAWINGS

FIG. 2A to 2D are diagrams showing a flow of a growing process of a nugget in a spot welding method according to an embodiment of the present invention;

DESCRIPTION OF EMBODIMENTS

Preferred embodiments of the spot welding method according to the present invention in relation to a spot welding device for carrying out the spot welding method will be described below in detail with reference to the accompanying drawings.

Figure 1:
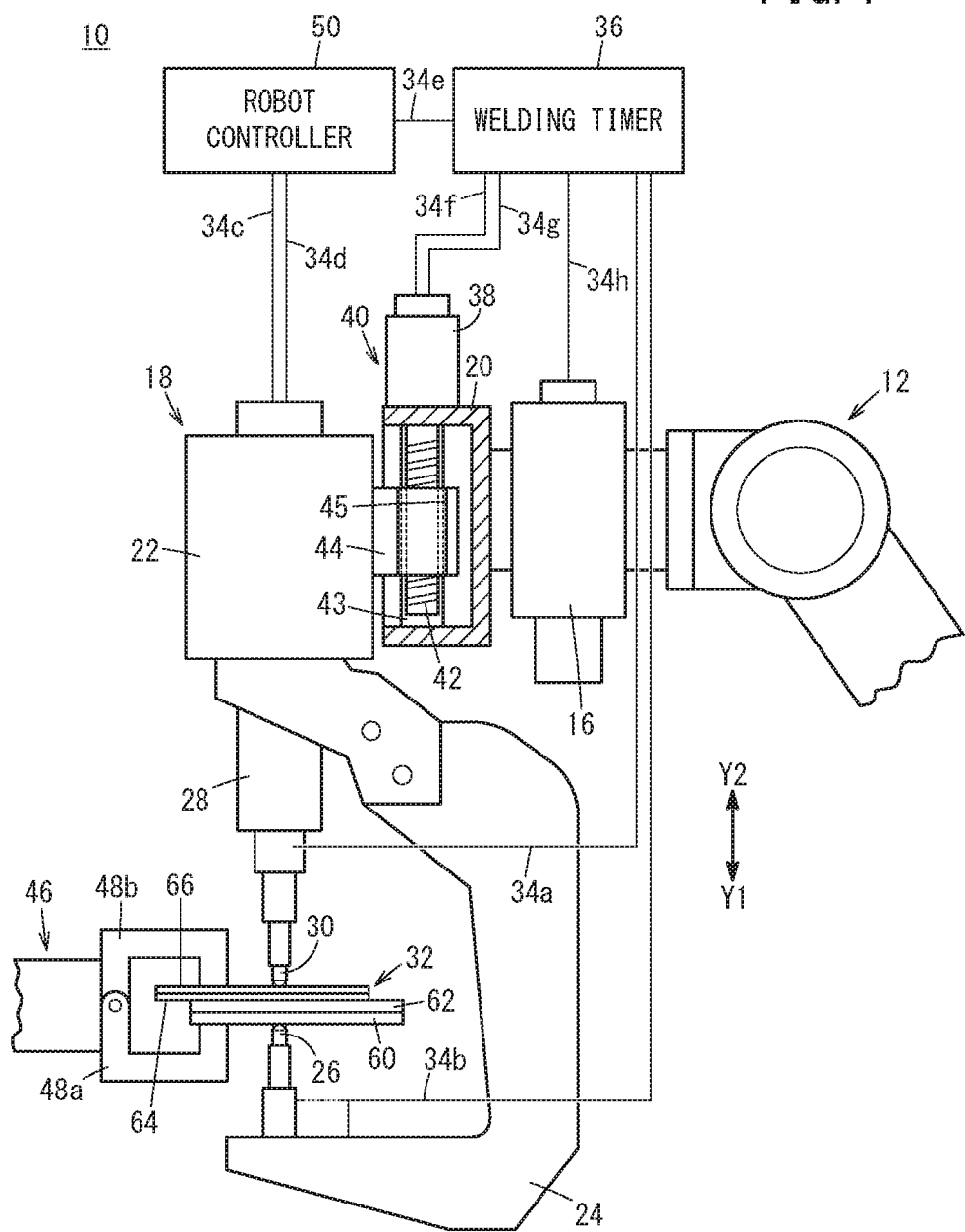
FIG. 1 is a schematic side view of a main part of a spot welding device according to a first embodiment of the present invention.

FIG. 1 is an enlarged view of a main part of a spot welding device 10 according to a first embodiment. The spot welding device 10 includes a robot (not shown) having an arm 12 and a welding gun 18 supported by a wrist portion 16 constituting the arm 12.

The welding gun 18 is attached to the wrist portion 16 via a hollow gun support bracket 20. In this case, the welding gun 18 is a so-called C type having a substantially C-shaped fixing arm 24 connected to the gun main body 22. A lower tip 26 as a second welding tip is provided at a lower end of the fixing arm 24, and the lower tip 26 extends toward the gun main body 22. The lower tip 26 is a fixed electrode tip positioned and fixed.

In the gun main body 22, unillustrated first servomotor and first ball screw mechanism are accommodated. The first servomotor is for rotating a first ball screw constituting the first ball screw mechanism. Then, an upper tip 30 (first welding tip) provided at a tip end of a connecting rod 28 and facing the lower tip 26 follows the rotation of the first ball screw, and displaces in a vertical direction, that is, a direction of the arrow Y2 or Y1 in FIG. 1. In this way, the upper tip 30 is a movable electrode tip that can move relatively close to or away from the lower tip 26.

The lower tip 26 and the upper tip 30 sandwich a laminated body 32 to be welded between the lower tip 26 and the upper tip 30, and conduct electricity through the laminated body 32. In the first embodiment, the lower tip 26 is electrically connected to a negative electrode of a power supply (not shown) housed in the wrist portion 16, while the upper tip 30 is electrically connected to a positive electrode of the power supply. That is, in the first embodiment, a welding current flows from the upper tip 30 toward the lower tip 26. This also applies to the second embodiment and the third embodiment to be described later.

A first force sensor (not shown) is embedded in the connecting rod 28 in the vicinity of the upper tip 30. Similarly, a second force sensor (not shown) is embedded in the vicinity of the lower tip 26 of the fixing arm 24. The first force sensor and the second force sensor are electrically connected to a welding timer 36 (pressing force detection means) via signal lines 34a and 34b, respectively.

The gun support bracket 20 is provided with a second ball screw mechanism 40 including a second servomotor 38. A second ball screw 42 constituting the second ball screw mechanism 40 rotates under the action of the second servomotor 38.

Here, the gun support bracket 20 is a hollow body having three side walls, and the wrist portion 16 is connected to one of the side walls. Further, on the remaining two side walls, guide rails 43 are provided on the inner surfaces opposed to each other. Note that in FIG. 1, only the guide rail 43 formed on the inner surface of the side wall on the back side of the paper is shown by cutting out the side wall on the near side of the paper.

A guide groove 45 for engaging with the guide rail 43 is formed on the side wall facing the guide rail 43 of a nut 44. Further, the second ball screw 42 is screwed into a screw hole penetratingly formed in the nut 44. Accordingly, as the second ball screw 42 rotates, the nut 44 is displaced in the arrow Y2 direction or the arrow Y1 direction in FIG. 1 while being guided by the guide rail 43 engaged with the guide groove 45.

The gun main body 22 is supported by the nut 44. Accordingly, the gun main body 22 and the fixing arm 24 follow the displacement of the nut 44 in the arrow Y2 direction or the arrow Y1 direction, and are displaced in the same direction as the nut 44 for each of the lower tip 26 and the upper tip 30.

The spot welding device 10 further includes a clamper 46 as a positioning and fixing means. The clamper 46 has a pair of claws 48a, 48b holding the laminated body 32 therebetween. By this holding with the claws 48a, 48b, the laminated body 32 is positioned and fixed.

In the above configuration, the first servomotor is electrically connected to a robot controller 50 via signal lines 34c and 34d. The robot controller 50 is electrically connected to the welding timer 36 via a signal line 34e, and the robot controller 50 and the welding timer 36 constitute a control means. That is, the welding timer 36 also serves as a pressing force detection means and a control means. The second servomotor 38 is further electrically connected to the welding timer 36 via signal lines 34f, 34g, and the power source is electrically connected via a signal line 34h.

To describe the laminated body 32 to be welded slightly, in this case, the laminated body 32 is formed by laminating four metal plates 60, 62, 64, 66 in this order from below. The thicknesses of the metal plates 60, 62 among them are set to, for example, about 0.8 mm to about 2 mm. On the other hand, the thicknesses of the metal plates 64, 66 are set smaller than the metal plates 60, 62, and are, for example, about 0.5 mm to about 0.7 mm. That is, the metal plates 60, 62 are thick-walled workpieces, and the metal plates 64, 66 are thin-walled workpieces. Consequently, the metal plate 60, which is a thick-walled workpiece, faces the lower tip 26, and the metal plate 66, which is a thin-walled workpiece, faces the upper tip 30.

Metal plates 60, 62 are high resistance workpieces made of, for example, so-called high tensile strength steel such as JAC 590, JAC 780 or JAC 980 (high performance high tensile strength steel plates defined in the Japan Iron and Steel Federation Standard). Further, the metal plates 64, 66 are low-resistance workpieces composed of, for example, so-called mild steel JAC 270 (high performance drawing steel plate defined by the Japan Iron and Steel Federation Standard). The metal plates 60, 62 may be of the same or different metallic species. Likewise, the metal plates 64, 66 may be of the same or different metallic species.

Basically, the spot welding device 10 according to the first embodiment is configured as described above. Next, the operation and effect will be explained in relation to the spot welding method according to the first embodiment.

When spot welding is performed on the laminated body 32, in other words, when the metal plates 60, 62, 64, 66 are joined and integrated, firstly the laminated body 32 is clamped by the claws 48a, 48b of the clamper 46 to be positioned and fixed. Then, next, the wrist portion 16, that is, the welding gun 18 is moved so that the arm 12 of the robot operates appropriately and the laminated body 32 is disposed between the lower tip 26 and the upper tip 30. At this point, the lower tip 26 contacts the metal plate 60.

Next, the robot controller 50 transmits a command signal to the first servomotor via the signal line 34e. The first servomotor receiving the command signal is energized and the first ball screw starts rotation operation. As a result, the upper tip 30 descends in the direction of arrow Y1 so that the upper tip 30 approaches the laminated body 32. As a result, the laminated body 32 is sandwiched between the lower tip 26 and the upper tip 30.

Here, the first force sensor detects the first pressing force F1 to the metal plate 66 (laminated body 32) by the upper tip 30. Further, the second force sensor detects the second pressing force F2 applied to the metal plate 60 (laminated body 32) by the lower tip 26. Each detected value is transmitted as a signal to the welding timer 36 via the signal lines 34a, 34b.

The welding timer 36 compares the first pressing force F1 and the second pressing force F2. In the first step of the initial welding, as shown in FIG. 2A, the first pressing force F1 is set smaller than the second pressing force F2 (F1<F2). More specifically, the welding timer 36 rotates the second ball screw 42 by energizing the second servomotor 38 by a command signal via the signal line 34f. As a result, the nut 44 is slightly displaced in the arrow Y2 direction while guiding it by the guide rail 43, and the gun main body 22 and the fixing arm 24 are displaced in the direction of the arrow Y2.

Along with this follow-up displacement, the lower tip 26 and the upper tip 30 are slightly displaced in the direction of the arrow Y2. That is, the lower tip 26 is displaced in a direction closer to the metal plate 60, and the upper tip 30 is displaced further away from the metal plate 66. Therefore, while the second pressing force F2 of the lower tip 26 with respect to the metal plate 60 increases, the first pressing force F1 of the upper tip 30 with respect to the metal plate 66 decreases.

The first pressing force F1 and the second pressing force F2 are fed back from the welding timer 36 to the second servomotor 38 via the signal line 34g. Further, since the laminated body 32 is positioned and fixed by sandwiching it between the claws 48a, 48b of the clamper 46, even if the first pressing force F1 and the second pressing force F2 change as described above, the body 32 will not be displaced.

When the difference between the first pressing force F1 and the second pressing force F2 reaches a predetermined value set in advance, the second servomotor 38 is deactivated. The gun main body 22 and the fixing arm 24, and thus the lower tip 26 and the upper tip 30, maintain the position at the time of the deactivation.

The welding timer 36 further transmits a control signal for starting energization to the power supply via the signal line 34h. As a result, a welding current starts to flow in a direction from the upper tip 30 to the lower tip 26. This is because each of the upper tip 30 and the lower tip 26 is connected to the positive electrode and the negative electrode of the power supply as described above. Thereafter, the welding current continues to flow until the spot welding is completed.

Here, the metal plates 60, 62 are higher in resistance than the metal plates 64, 66 owing to the greater thickness. Also, the first pressing force F1 is smaller than the second pressing force F2. Together with the above reasons, the contact resistance between the metal plates 62, 64 becomes larger than the contact resistance between the metal plates 60, 62 and between the metal plates 64, 66. Therefore, the amount of Joule heat generated (heat generation amount) between the metal plates 62, 64 becomes the maximum in the laminated body 32.

Therefore, in the first step, as shown in FIG. 2A, the interface between the metal plate 62 and the metal plate 64 is preferentially heated, and then starts to be melted when the temperature rises sufficiently. As a result, a nugget 70 as a melted part (liquid phase) is formed between the metal plates 62, 64. That is, the metal plates 62, 64 are integrated with each other.

When the nugget 70 is formed, since the nugget 70 is soft, the metal plates 62, 64 slightly approach each other. Accordingly, the first pressing force F1 and the second pressing force F2 are reduced. In this state, the welding current continues to flow, whereby the nugget 70 grows. As shown in FIG. 2B, the nugget 70 grows preferentially in a direction toward an interface between the metal plates 64, 66 having a large contact resistance, and then the metal plates 64, 66 are melted and integrated.

As the nugget 70 grows in this way, the first pressing force F1 and the second pressing force F2 further decrease. When the first force sensor and the second force sensor detect the decrease, the robot controller 50 recognizes that "a nugget 70 extending across the metal plates 62, 64, 66 has been formed".

Next, the robot controller 50 transmits to the second servomotor 38 via the signal line 34f a command signal "to make the first pressing force F1 and the second pressing force F2 equal (F1=F2)". Upon receiving this command signal, the second servomotor 38 rotates the second ball screw 42 in the direction opposite to the first step. As a result, the nut 44 is slightly displaced in the direction of the arrow Y1, and the gun main body 22 and the fixing arm 24, and consequently the upper tip 30 and the lower tip 26, are displaced in the direction of the arrow Y1.

In this case, the lower tip 26 is displaced in a direction away from the metal plate 60, and the upper tip 30 is displaced in a direction approaching the metal plate 66. Accordingly, while the first pressing force F1 of the upper tip 30 to the metal plate 66 increases, the second pressing force F2 of the lower tip 26 with respect to the metal plate 60 decreases.

When the first pressing force F1 and the second pressing force F2 become equal, the second servomotor 38 is deactivated. The lower tip 26 and the upper tip 30 maintain the position at the time of the deactivation. The welding current continuously flows under this circumstance, so that the second step is carried out and the welding stage shifts to the middle.

Since the first pressing force F1 and the second pressing force F2 are equal to each other, the contact area between the metal plates 60, 62 becomes smaller as compared to the first process in which the first pressing force F1 is made smaller than the second pressing force F2. Therefore, the contact resistance between the metal plates 60, 62 becomes larger than that in the first process, and as a result, the amount of heat generated between the metal plates 60, 62 increases.

On the other hand, the contact resistances between the metal plates 62, 64 and between the metal plates 64, 66 become smaller than those in the first step. This is because in the second step, the first pressing force F1 is larger than in the first step. Therefore, it is difficult for the nugget 70 to grow toward the side of the upper tip 30. For the reasons described above, the nugget 70 grows preferentially toward the metal plate 60 as shown in FIG. 2C. That is, the nugget 70 grows to the vicinity of the contact surfaces of the metal plates 60, 62.

FIG. 2C shows a state in which the contact surfaces of the metal plates 60, 62 are melted. However, in the second step, there is no particular need to melt and integrate the metal plates 60, 62. In other words, the second process may be terminated when the nugget 70 has not reached the contact surfaces of the metal plates 60, 62.

As the nugget 70 grows in this way, the first pressing force F1 and the second pressing force F2 further decrease. When the decrease is detected by the first force sensor and the second force sensor, the robot controller 50 recognizes that "the nugget 70 extending across the metal plates 62, 64, 66 has grown sufficiently".

Next, the robot controller 50 transmits to the second servomotor 38 via the signal line 34f a command signal "to make the first pressing force F1 larger than the second pressing force F2 (F1>F2)". Upon receiving this command signal, the second servomotor 38 rotates the second ball screw 42 in the same direction as in the second step. As a result, the nut 44 is slightly displaced in the direction of the arrow Y1, and the gun main body 22 and the fixing arm 24, and consequently the upper tip 30 and the lower tip 26, follows to be displaced in the direction of the arrow Y1.

In this case, the lower tip 26 is displaced further away from the metal plate 60, and the upper tip 30 is displaced in a direction closer to the metal plate 66. Therefore, as the first pressing force F1 of the upper tip 30 relative to the metal plate 66 further increases, the second pressing force F2 of the lower tip 26 with respect to the metal plate 60 further decreases, and the relationship between F1 and F2 varies from F1=F2 to F1>F2.

When the first pressing force F1 becomes larger than the second pressing force F2, the second servomotor 38 is deactivated. The lower tip 26 and the upper tip 30 maintain the position at the time of the deactivation. The welding current is continuously supplied under these circumstances, so that the third step is carried out and the welding stage shifts to the late stage of the welding.

Since the first pressing force F1 is larger than the second pressing force F2, compared to the second process in which the first pressing force F1 and the second pressing force F2 are equalized, the contact area between the metal plates 60, 62 is further reduced. Therefore, the contact resistance between the metal plates 60, 62 becomes larger than those in the first step and the second step, and as a result, the amount of heat generated between the metal plates 60, 62 increases.

Therefore, as shown in FIG. 2D, the nugget 70 preferentially grows toward the metal plate 60 side so as to include the contact surfaces of the metal plates 60, 62. Eventually, the nugget 70 integrates the metal plates 60, 62. As described above, the metal plates 60, 62, 64, 66 are integrated via the nugget 70.

After the lapse of a predetermined time, the welding current is stopped to complete the third step, and the upper tip 30 is separated from the metal plate 64. The time required from the start of the first step to the end of the third step is typically within one second.

In this way, as the energization is stopped, the heat generation of the metal plates 60, 62, 64, 66 is also terminated. As the time elapses, the nugget 70 is cooled and solidified into a solid phase, and a joined product in which the metal plates 60, 62, 64, 66 are integrally joined via the nugget 70 is obtained.

As described above, according to the first embodiment, by changing the pressing forces F1, F2 of the lower tip 26 and the upper tip 30, it is possible to grow a nugget 70 extending across all the workpieces of the metal plates 60, 62, 64, 66. Therefore, even if the space where the spot welding is performed is narrow so that it is difficult to use an auxiliary electrode, it is possible to obtain a joined product having a large joint strength.

In addition, since it is unnecessary to provide an auxiliary electrode, it is possible to avoid the structure of the spot welding device 10 from being complicated and increasing its size.

It should be noted that the second force sensor may be provided on the lower tip 26 as indicated by a broken line in FIG. 1.

Next, a second embodiment will be described. Note that the same reference numerals are given to the same components as those shown in FIG. 1 and FIGS. 2A to 2D, and a detailed description thereof will be omitted.

Figure 3:
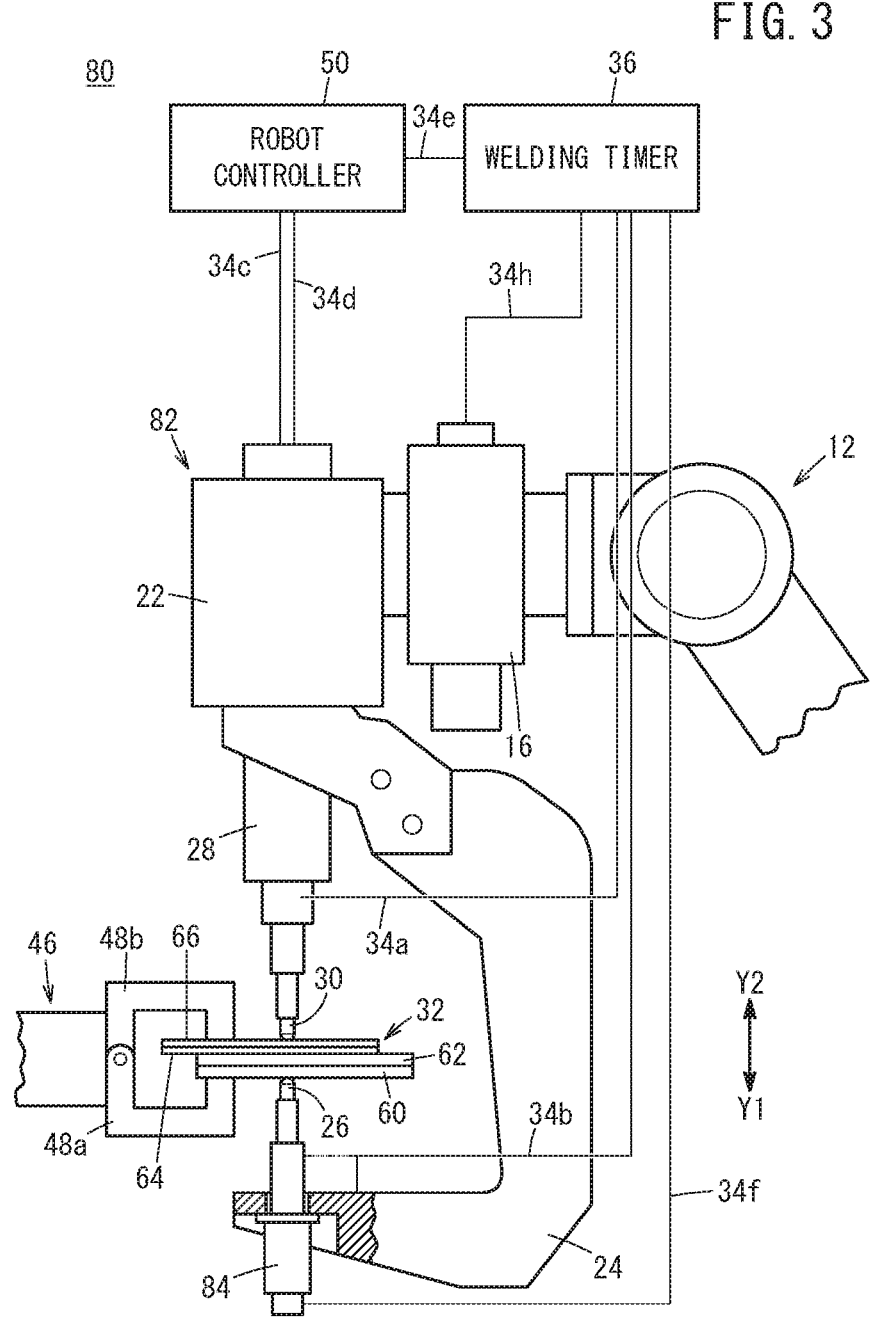
FIG. 3 is a schematic side view of a main part of a spot welding device according to a second embodiment of the present invention.

FIG. 3 is an enlarged view of a main part of a spot welding device 80 according to the second embodiment. In the spot welding device 80, a gun main body 22 of a welding gun 82 is directly supported by a robot and a wrist portion 16 constituting an arm 12.

The welding gun 82 is a C-shaped gun equipped with a fixing arm 24. A lower tip 26 of the fixing arm 24 is held via an electric cylinder 84 incorporated in a servomotor. That is, in the second embodiment, the lower tip 26 is a movable electrode tip that is displaceable in the direction of approaching or separating from an upper tip 30 under the action of the electric cylinder 84.

On the other hand, the upper tip 30 follows rotation of a first ball screw under the action of a servomotor housed in the gun main body 22, and is displaced in a direction of approaching or separating from the lower tip 26. That is, the upper tip 30 is a movable electrode tip as in the first embodiment.

Spot welding using the spot welding device 80 according to the second embodiment is carried out as follows.

First, a laminated body 32 is held by a clamper 46, and positioned and fixed. Then, a welding gun 82 is moved so that the arm 12 of the robot properly operates and the laminated body 32 is disposed between the lower tip 26 and the upper tip 30.

At this point, the lower tip 26 may be brought into contact with a metal plate 60. When the lower tip 26 is not in contact with the metal plate 60, a welding timer 36 urges the electric cylinder 84 by a command signal via a signal line 34f to displace the lower tip 26 in the direction of the arrow Y2 under the action of the electric cylinder 84. As a result, the lower tip 26 abuts against the metal plate 60.

Alternatively, when moving the welding gun 82, the upper tip 30 may be brought into contact with the metal plate 66. When the upper tip 30 is not in contact with the metal plate 66, the welding timer 36 urges the first ball screw by a command signal via the signal line 34c to displace the upper tip 30 in the direction of the arrow Y1 under the action of the first ball screw. As a result, the upper tip 30 abuts against the metal plate 66.

With the above-mentioned abutment, the laminated body 32 is gripped and held between the lower tip 26 and the upper tip 30. Both the abutment of the lower tip 26 with the metal plate 60 and the abutment of the upper tip 30 with the metal plate 66 may be performed either successively or at the same time.

Thereafter, the first pressing force F1 and the second pressing force F2 are controlled in the same manner as in the first embodiment. That is, in the first step, as shown in FIG. 2A, the first pressing force F1 is set smaller than the second pressing force F2 (F1<F2).

Here, in order to make the first pressing force F1 smaller than the second pressing force F2, the welding timer 36 urges the electric cylinder 84 by a command signal via the signal line 34f to displace the lower tip 26 slightly in the direction of arrow Y2. That is, the lower tip 26 is displaced in a direction more close towards the metal plate 60. As a result, the second pressing force F2 can be made larger than the first pressing force F1.

When the difference between the first pressing force F1 and the second pressing force F2 reaches a predetermined value set in advance, the electric cylinder 84 is deactivated. The lower tip 26 keeps the position at the time of this deactivation. Further, the upper tip 30 maintains the position at the time of the abutment with the metal plate 66, so that the first pressing force F1 is also maintained.

Instead of carrying out the above operation, when the lower tip 26 and the upper tip 30 clamp the laminated body 32, the lower tip 26 is brought into contact with the metal plate 60 so that F1<F2, and the upper tip 30 may be brought into abutment with the metal plate 66.

In this state, the welding timer 36 transmits a control signal to start energization to the power source. As a result, a welding current flows in a direction from the upper tip 30 to the lower tip 26, and spot welding is started. In the first step, as shown in FIGS. 2A and 2B, a nugget 70 as a melted part (liquid phase) is formed between the metal plates 62, 64, and the metal plates 62, 64 are integrated with each other.

When the nugget 70 grows so as to extend across the metal plates 62, 64, 66, the robot controller 50 transmits a command signal "to set F1=F2" to the electric cylinder 84 via the signal line 34f. Upon receiving this command signal, the electric cylinder 84 slightly displaces the lower tip 26 in a direction away from the metal plate 60 (in the arrow Y1 direction). Therefore, while the first pressing force F1 of the upper tip 30 against the metal plate 66 is maintained, the second pressing force F2 of the lower tip 26 with respect to the metal plate 60 becomes equal to the first pressing force F1.

When the first pressing force F1 and the second pressing force F2 become equal, the electric cylinder 84 is deactivated. The welding current flows continuously under this circumstance, so that the second step is carried out. As a result, as shown in FIG. 2C, the nugget 70 grows preferentially toward the metal plate 66.

When the first force sensor and the second force sensor detect decrease of that the first pressing force F1 and the second pressing force F2 with the sufficient growth of the nugget 70 extending across the metal plates 62, 64, 66, The robot controller 50 transmits a command signal "F1>F2" to the electric cylinder 84 via the signal line 34f. Upon receiving this command signal, the electric cylinder 84 slightly displaces the lower tip 26 in the direction of arrow Y1. Therefore, while the first pressing force F1 of the upper tip 30 with respect to the metal plate 66 is maintained, the second pressing force F2 of the lower tip 26 with respect to the metal plate 60 is reduced to become smaller than the first pressing force F1. That is, the relationship between F1 and F2 varies from F1=F2 to F1>F2.

When the first pressing force F1 becomes larger than the second pressing force F2, the electric cylinder 84 is deactivated. The welding current flows continuously under this circumstance, so that the third step is carried out.

Since the first pressing force F1 is larger than the second pressing force F2, the amount of heat generated between the metal plates 60, 62 increases. Accordingly, as shown in FIG. 2D, the nugget 70 preferentially grows between the metal plates 60, 62, so that the metal plates 60, 62, 64, 66 are integrated via the nugget 70 as a result.

After the lapse of a predetermined time, the welding current is stopped to complete the third step, and the upper tip 30 is separated from the metal plate 64. Thereafter, the nugget 70 is cooled and solidified into a solid phase, and a joined product in which the metal plates 60, 62, 64, 66 are integrally joined is obtained.

As described above, also in the second embodiment, it is possible to relatively change the pressures F1, F2 of the lower tip 26 and the upper tip 30. Therefore, even when the space for performing the spot welding is narrow and therefore an auxiliary electrode cannot be used for this purpose, the nugget 70 extending across all the workpieces of the metal plates 60, 62, 64, 66 can be grown. Of course, the joined product has excellent joint strength.

In addition, since it is unnecessary to provide an auxiliary electrode, it is possible to avoid the structure of the spot welding device 10 from being complicated and increasing its size.

It should be noted that the second force sensor may be provided on the lower tip 26 as indicated by a broken line in FIG. 3.

Next, a third embodiment will be described. Note that the same reference numerals are given to the same components as those shown in FIGS. 1 to 3, and a detailed description thereof will be omitted.

Figure 4:
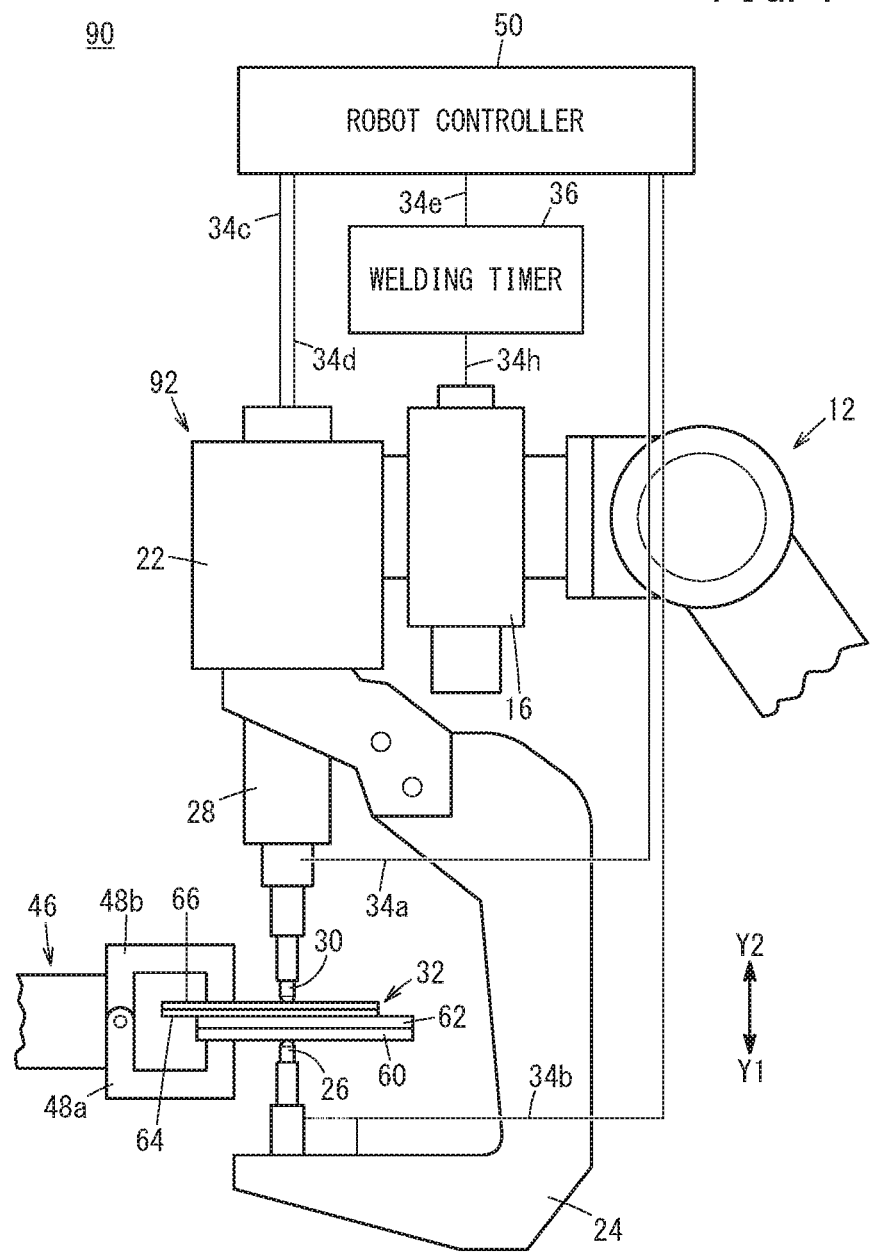
FIG. 4 is a schematic side view of a main part of a spot welding device according to a third embodiment of the present invention.
Figures 5A, 5B, 5C, 5D:
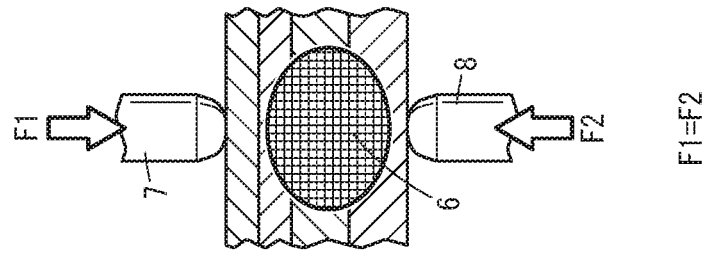
FIGS. 5A to 5D are diagrams showing a flow of a growing process of a nugget in a spot welding method according to a conventional technique.

FIG. 4 is an enlarged view of a main part of a spot welding device 90 according to the third embodiment. In the spot welding device 90, a gun main body 22 of a welding gun 92 is directly supported by a robot and the wrist portion 16 constituting the arm 12.

The welding gun 92 is a C-shaped gun equipped with a fixing arm 24. A lower tip 26 is provided at a lower end of the fixing arm 24. That is, in the third embodiment, the lower tip 26 is a fixed electrode tip positioned and fixed.

On the other hand, the upper tip 30 follows rotation of a first ball screw under the action of a first servomotor housed in the gun main body 22, and is displaced in a direction of approaching or separating from the lower tip 26. That is, the upper tip 30 is a movable electrode tip as in the first embodiment and the second embodiment.

Spot welding using the spot welding device 90 according to the third embodiment is carried out as follows.

First, the laminated body 32 is held by the clamper 46 and positioned and fixed. Then, the welding gun 92 is moved so that the arm 12 of the robot properly operates and the laminated body 32 is disposed between the lower tip 26 and the upper tip 30. At this point, the lower tip 26 abuts the metal plate 60.

Next, the robot controller 50 transmits a command signal to the first servomotor via the signal line 34c. The first servomotor receiving the command signal is energized and the first ball screw starts rotating operation. As a result, the upper tip 30 descends in the direction of arrow Y1 so that the upper tip 30 approaches the laminated body 32. As a result, the laminated body 32 is sandwiched between the lower tip 26 and the upper tip 30.

Thereafter, the first pressing force F1 and the second pressing force F2 are controlled in the same manner as in the first embodiment and the second embodiment. That is, in the first step, the arm 12 or the wrist portion 16 is operated so as to reduce the first pressing force F1 as compared with the second pressing force F2, whereby the lower tip 26 is moved toward the metal plate 60, while the upper tip 30 is displaced further in a direction away from the metal plate 66. At the same time, as a result, while the second pressing force F2 increases, the first pressing force F1 of the upper tip 30 with respect to the metal plate 66 decreases. That is, the relationship between F1 and F2 becomes F1<F2.

When the difference between the first pressing force F1 and the second pressing force F2 reaches a predetermined value set in advance, the operation of the arm 12 or the wrist portion 16 is stopped. The lower tip 26 and the upper tip 30 maintain the position at the time of the stoppage operation.

In this state, the welding timer 36 transmits a control signal to start power distribution to the power source. As a result, a welding current flows in a direction from the upper tip 30 to the lower tip 26, and spot welding is started. In the first step, as shown in FIGS. 2A and 2B, a nugget 70 as a melted part (liquid phase) is formed between the metal plates 62, 64, and the metal plates 62, 64 are integrated with each other.

When the nugget 70 grows to extend across the metal plates 62, 64, 66, the robot controller 50 transmits a command signal "to set F1=F2" to the robot via the signal line 34f. In response to this command signal, the robot operates the arm 12 or the wrist portion 16 to displace the lower tip 26 slightly in a direction away from the metal plate 60 (in the direction of the arrow Y1) and to move the upper tip 30 to the metal plate 66 (In the direction of the arrow Y1). Therefore, while the first pressing force F1 of the upper tip 30 with respect to the metal plate 66 increases, the second pressing force F2 of the lower tip 26 with respect to the metal plate 60 decreases, resulting in F1=F2.

When the first pressing force F1 and the second pressing force F2 become equal, the arm 12 or the wrist portion 16 stops operating. The welding current flows continuously under this circumstance, so that the second step is carried out. As a result, as shown in FIG. 2C, the nugget 70 grows preferentially toward the metal plate 66.

When the first force sensor and the second force sensor detect that the first pressing force F1 and the second pressing force F2 have decreased with the sufficient growth of the nugget 70 extending across the metal plates 62, 64, 66, the robot controller 50 transmits a command signal "F1>F2" to the robot. In response to this command signal, the robot operates the arm 12 or the wrist portion 16 to further displace the lower tip 26 in a direction away from the metal plate 60 (in the direction of the arrow Y1) and further displaces the upper tip 30 against the metal plate 66 (in the direction of the arrow Y1). Therefore, while the first pressing force F1 of the upper tip 30 to the metal plate 66 increases, the second pressing force F2 of the lower tip 26 with respect to the metal plate 60 decreases, resulting in F1>F2.

When the first pressing force F1 becomes larger than the second pressing force F2, the arm 12 or the wrist portion 16 stops operating. The welding current flows continuously under this circumstance, so that the third step is carried out.

Since the first pressing force F1 is larger than the second pressing force F2, the amount of heat generated between the metal plates 60, 62 increases. Accordingly, as shown in FIG. 2D, the nugget 70 preferentially grows between the metal plates 60, 62, so that the metal plates 60, 62, 64, 66 are integrated via the nugget 70 as a result.

After the lapse of a predetermined time, the welding current is stopped to complete the third step, and the upper tip 30 is separated from the metal plate 64. Thereafter, the nugget 70 is cooled and solidified into a solid phase, and a joined product in which the metal plates 60, 62, 64, 66 are integrally joined is obtained.

As described above, also in the third embodiment, the pressures F1 and F2 of the lower tip 26 and the upper tip 30 can be changed. Therefore, it is possible to grow a nugget 70 that extends across all workpieces of the metal plates 60, 62, 64, 66 without using an auxiliary electrode. It is a matter of course that the joined product has excellent joint strength.

In addition, since it is unnecessary to provide an auxiliary electrode, it is possible to avoid the structure of the spot welding device 10 from being complicated and increasing its size.

It should be noted that the second force sensor may be provided on the lower tip 26 as indicated by a broken line in FIG. 4.

The present invention is not particularly limited to the above-described first to third embodiments, and various modifications are possible without departing from the gist of the present invention.

For example, the welding current may be made to flow from the lower tip 26 toward the upper tip 30.

In the first to third embodiments, the two metal plates 64, 66 made of mild steel are superimposed on the two metal plates 60, 62 made of high tensile strength steel. However, in the present invention, it is applicable when three or more metal plates are laminated and one of the outermost two metal plates is a thin wall workpiece and the other one is a thick wall workpiece.

Further, a linear direct motor, a piezoelectric actuator, a cylinder, or the like may be adopted in place of a ball screw mechanism including a servomotor.

What is claimed is:

1. A spot welding method for spot welding by welding current flowing between a first welding tip and a second welding tip, wherein a laminated body is formed of at least three workpieces stacked and including two outermost workpieces, the two outermost workpieces being a thin-walled workpiece and a thick-walled workpiece which are different in thickness from each other, and the laminated body is sandwiched between a first welding tip and a second welding tip, the spot welding method comprising, while the welding current flows through the laminated body positioned and fixed, the steps of:
   a first step of making a first pressing force to be applied to the laminated body from the first welding tip brought into contact with the thin-walled workpiece smaller than a second pressing force to be applied to the laminated body from the second welding tip brought into contact with the thick-walled workpiece, while forming a nugget between two of the workpieces forming the laminated body for integration of the two workpieces;
   a second step of making the first pressing force and the second pressing force equal, while growing the nugget toward the thick-walled workpiece; and
   a third step of making the first pressing force greater than the second pressing force, while growing the nugget until the thick-walled workpiece becomes integral with an adjacent one of the workpieces.

2. The spot welding method according to claim 1, wherein a welding gun having the first welding tip and the second welding tip is displaced with respect to the laminated body to relatively change the first pressing force and the second pressing force.

3. The spot welding method according to claim 1, wherein the second welding tip is displaced in a direction toward or away from the thick-walled workpiece to relatively change the first pressing force and the second pressing force.

4. A spot welding device for spot welding comprising:
   a positioning and fixing unit configured to position and fix a laminated body formed of at least three workpieces stacked wherein two outermost workpieces are a thin-walled workpiece and a thick-walled workpiece that are different in thickness from each other;
   a welding gun including a first welding tip and a second welding tip to grip and hold the laminated body for passing a welding current;
   a pressing force detection unit configured to detect a first pressing force applied to the laminated body by the first welding tip brought into contact with the thin-walled workpiece and a second pressing force applied to the laminated body by the second welding tip brought into contact with the thick-walled workpiece; and
   a control unit configured to control the first pressing force and the second pressing force based on a detection value detected by the pressing force detecting unit,
   wherein the control unit makes the first pressing force smaller than the second pressing force, while a nugget is formed between two of the workpieces constituting the laminated body to integrate the two workpieces, makes the first pressing force and the second pressing force equal, while the nugget is grown toward the thick-walled workpiece, and makes the first pressing force greater than the second pressing force, while the nugget is grown until the thick-walled workpiece becomes integral with adjacent one of the workpieces.

5. The spot welding device according to claim 4, wherein the welding gun is displaced with respect to the laminated body under control of the control unit to change the first pressing force and the second pressing force relatively.

6. The spot welding device according to claim 5, further comprising a robot supporting the welding gun,
   wherein the welding gun is displaced with respect to the laminated body by an operation of the robot under the control of the control unit.

7. The spot welding device according to claim 4, wherein the second welding tip is displaced toward or away from the thick-walled workpiece to change the first pressing force and the second pressing force relatively under the control of the control unit.

* * * * *